United States Patent
Lu

(10) Patent No.: US 9,727,386 B2
(45) Date of Patent: Aug. 8, 2017

(54) METHOD AND APPARATUS FOR NETWORK RESOURCE VIRTUAL PARTITIONING

(71) Applicant: FutureWei Technologies, Inc., Plano, TX (US)

(72) Inventor: Yunsong Lu, Mountain View, CA (US)

(73) Assignee: Futurewei Technologies, Inc., Plano, TX (US)

( * ) Notice: Subject to any disclaimer, the term of this patent is extended or adjusted under 35 U.S.C. 154(b) by 225 days.

(21) Appl. No.: 13/650,816

(22) Filed: Oct. 12, 2012

(65) Prior Publication Data
US 2014/0108584 A1    Apr. 17, 2014

(51) Int. Cl.
| G06F 15/16 | (2006.01) |
| G06F 9/50 | (2006.01) |
| H04L 12/917 | (2013.01) |

(52) U.S. Cl.
CPC ............ *G06F 9/5077* (2013.01); *H04L 47/76* (2013.01)

(58) Field of Classification Search
CPC ............... G06F 9/5077; G06F 9/45558; G06F 2009/45579; G06F 13/4022; G06F 2213/0026; G06F 2009/45595; H04L 45/38
See application file for complete search history.

(56) References Cited

U.S. PATENT DOCUMENTS

| 7,733,890 B1* | 6/2010 | Droux et al. ................. 370/412 |
| 2009/0292858 A1* | 11/2009 | Lambeth ........... H04L 29/12839 711/6 |
| 2009/0313391 A1* | 12/2009 | Watanabe ......................... 710/8 |
| 2010/0115174 A1* | 5/2010 | Akyol et al. .................. 710/316 |
| 2012/0002535 A1* | 1/2012 | Droux et al. ................. 370/216 |
| 2012/0284712 A1* | 11/2012 | Nimmagadda et al. .......... 718/1 |
| 2012/0287786 A1* | 11/2012 | Kamble et al. ............... 370/235 |
| 2013/0132952 A1* | 5/2013 | Shah ................................ 718/1 |

(Continued)

OTHER PUBLICATIONS

Brocade, "Brocade 1860 Fabric Adapter I/O Virtualization and Virtual Switching", Jul. 2011, qlogic.com [online], [retrieved on Aug. 20, 2012]. Retrieved from Internet < http://www.qlogic.com/Resources/Documents/TechnologyBriefs/Adapters/IO-Virtualization_TB.pdf >.*

(Continued)

*Primary Examiner* — Tauqir Hussain
*Assistant Examiner* — Austin Moreau
(74) *Attorney, Agent, or Firm* — Slater Matsil, LLP

(57) ABSTRACT

A method and apparatus are disclosed for network resource virtual partitioning. An embodiment method includes mapping a plurality of hardware functions at a plurality of physical network interface devices into a plurality of virtual partitions (VPs) implemented using software, wherein the VPs are configured to manage and operate independent from one another the corresponding hardware functions at the physical network interface devises. An embodiment apparatus includes a processor configured to aggregate a plurality of hardware functions at a plurality of physical network interface devices into a plurality of virtual partition aggregations (VPAs), wherein the VPAs are configured to manage and operate independent from one another a plurality of corresponding subsets of the hardware functions to serve one or more clients.

21 Claims, 2 Drawing Sheets

(56) References Cited

U.S. PATENT DOCUMENTS

| | | | |
|---|---|---|---|
| 2013/0148669 A1* | 6/2013 | Noguchi et al. | 370/401 |
| 2013/0151685 A1* | 6/2013 | Bursell | 709/223 |
| 2013/0173810 A1* | 7/2013 | Subramaniam | G06F 15/161 |
| | | | 709/227 |
| 2014/0059265 A1* | 2/2014 | Iyer | G06F 9/5011 |
| | | | 710/313 |

OTHER PUBLICATIONS

"Multi-Root I/O Virtualization and Sharing Specification." PCI-SIG, May 12, 2008. Web. Mar. 3, 2016. <https://members.pcisig.com/wg/PCI-SIG/document/download/8280>.*

* cited by examiner

METHOD AND APPARATUS FOR NETWORK RESOURCE VIRTUAL PARTITIONING

TECHNICAL FIELD

The present invention relates to the field of network hardware configuration and resource partitioning, and, in particular embodiments, to a method and apparatus for network resource virtual partitioning.

BACKGROUND

In modern computing systems, virtualization capability is implemented and supported on hardware, operating systems, hypervisors, routers, and other components and aspects. Virtualization support for network resources is needed to improve the overall efficiency of hardware utilization, lower the overall cost, and improve performance. For example, the increasing deployment of 10 Gigabit (Gb) Ethernet and the advancement of 40 Gb network technologies demand better network bandwidth sharing. Additionally, network convergence technologies, such as Fiber Channel over Ethernet (FCoE), impose challenges to the traditional means of sharing network resources, including currently used Network Interface Card (NIC) and switch components.

Virtualization for network resources can include both resource sharing (e.g., bandwidth sharing) and link aggregation. Resource sharing needs sufficient availability (i.e., sufficient resource or bandwidth available for sharing), while resource aggregation needs sufficient bandwidth and failure tolerance. One issue raised by virtualization of network resources, e.g., for bandwidth sharing, is achieving a hardware-independent implementation to support migration among different types of hardware from different vendors. Various techniques are developed or proposed to address the issue of independent-hardware implementation. However, the proposed techniques may not sufficiently meet the requirements of high manageability, hardware independence, high availability, and high performance.

SUMMARY

In one embodiment, a method for network resource virtual partitioning includes mapping a plurality of hardware functions at a plurality of physical network interface devices into a plurality of virtual partitions (VPs) implemented using software, wherein the VPs are configured to manage and operate independent from one another the corresponding hardware functions at the physical network interface devises.

In another embodiment, an apparatus for network resource virtual partitioning includes one or more physical network interface devices configured to communicate network traffic, a processor, and a computer readable storage medium storing programming for execution by the processor, the programming including instructions to map a plurality of hardware functions at the one or more physical network interface devices into a plurality of VPs, wherein the VPs are configured to manage and operate independent from one another the corresponding hardware functions at the one or more physical network interface devices.

In yet another embodiment, a network component supporting network resource virtual partitioning includes a processor and a computer readable storage medium storing programming for execution by the processor, the programming including instructions to aggregate a plurality of hardware functions at a plurality of physical network interface devices into a plurality of virtual partition aggregations (VPAs), wherein the VPAs are configured to manage and operate independent from one another a plurality of corresponding subsets of the hardware functions to serve one or more clients.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Previous and current network resource sharing schemes include software bridge-based NIC sharing, which may not utilize some hardware capabilities, such as network Layer 2 (L2) classification. In comparison, channel-level packet classification based virtual NICs may have improved performance but depend on certain or determined hardware features and are not compatible with other virtual-capable hardware, for example Single Root Input/Output Virtualization (SR-IOV) devices. SR-IOV is a device-level virtualization scheme that uses physical function (PF) drivers and virtual function (VF) drivers, which may be hardware dependent and specific. Further, link aggregation schemes, such as interface-level Link Aggregation Control Protocol (LACP)-based link aggregation, may not utilize some hardware virtualization capabilities and are not compatible with either multi-channel hardware or SR-IOV devices.

Embodiments including an apparatus and a method are disclosed herein for network resource management using virtual partitioning. The embodiments virtually partition network hardware, such as NICs. By abstracting various types of hardware capabilities, one or more virtual partitions are defined, e.g., at an operation system (OS) level, and organized as independent functional portions of one or more physical NIC devices. A master-slave device aggregation model is used to aggregate or group multiple virtual partitions (VPs) into VP aggregations (VPAs). The VPAs include a master VPA and one or more slave VPAs. The master VPA maintains aggregation status and policy that are shared by the slave VPAs. A slave VPA inherits and uses the aggregation status and policy of the master VPA but may not have independent status and policy. The embodiments also allow the dynamic allocation and/or reallocation of hardware resource among the VPs (e.g., for resource rebalancing). A VP/VPA-based dual-mode virtual network interface (VNI) provider model is also used, where the VNI provider can be operated as a standard VNI provider for a direct network interface device or the VPAs can serve as multiple VNI provider instances for one or more clients, e.g., one or more hosts or virtual NICs. The embodiments and models above provide hardware-independent implementation and support both SR-IOV devices for resource sharing and interface-level LACP-based link aggregation. The schemes disclosed herein may also provide better resource utilization and availability, improve VNI performance, and simplify network resource management.

Figure 1:
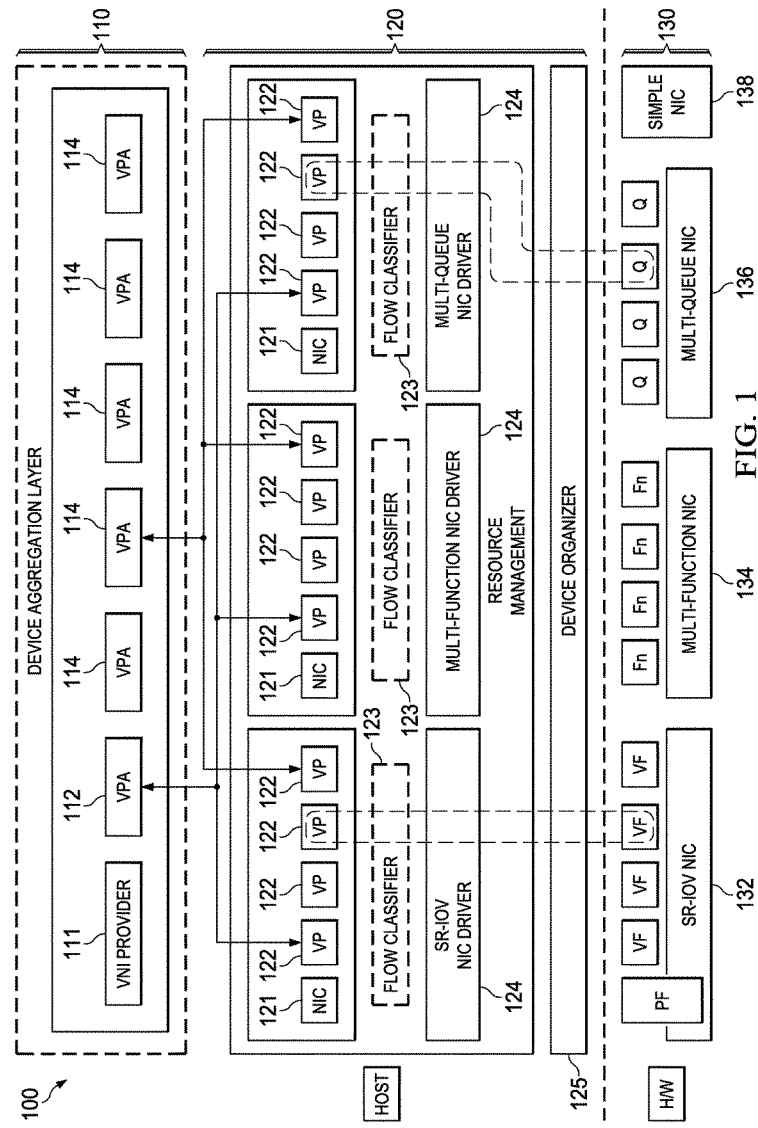
FIG. 1 illustrates an embodiment apparatus for network resource virtual partitioning.

FIG. 1 illustrates an embodiment apparatus 100 for network resource virtual partitioning. The apparatus 100 comprises a device aggregation layer 110 and a resource management layer 120, which may be implemented at an OS (or a software layer) that runs on a hardware component. The hardware component may be a server, a hypervisor, a bridge, or other suitable network components or devices. The hardware component also comprises or is coupled to one or more physical NICs 130 or equivalent network interfaces or physical devices. The physical NICs 130 or equivalent physical devices can be of different types and have different features and/or functions, e.g., based on different standards and different equipment vendors. For instance, the physical NICs 131 include a SR-IOV NIC 132, a multi-function NIC 134, a multi-queue NIC 136, and/or other NICs 138, such as NICs that provide basic or simple packet forwarding functions.

The device aggregation layer 110 includes a VNI provider 111, at least one master VPA 112, and one or more slave VPAs 114. The components of the device aggregation layer 110 may be implemented using software, such as an OS that operates on hardware. The VNI provider 111 is a logical or virtualized representation that manages and operates at least some of the functions of the physical NICs 130. A VNI provider 111 can be configured to represent one of the physical NICs 130 or share a plurality of functions supported by multiple physical NICs 130, e.g., different functions of the SR-IOV-NIC 132, multi-function NIC 134, multi-queue NIC 136, and/or other NICs 138. This is referred to herein as a dual-mode VIN provider model. The management and operation of the physical NICs 130 includes the configuration of a plurality of VPAs based on a master-slave model. Accordingly, the master VPA 112 and one or more slave VPAs 114 that are associated with the master VPA 112 are created and maintained at the VNI provider 111. The VPAs at the VNI provider 111 can serve as VNI provider instances for one or more clients, e.g., servers, hosts, or virtual NICs.

The master VPA 112 is an aggregation (e.g., represented by software) of multiple VPs 122 and is configured with an aggregation status and policy for managing and operating the VPs 122. For example, the aggregation status indicates a master VPA and its association with the VNI provider 111 and corresponding slave VPAs 114. The policy describes a set of rules for managing and operating the aggregation of VPs 122. Additionally, the master VPA 112 can be reconfigured to make changes to the aggregation, such as adding or removing VPs 122 from the aggregation. The master VPA 112 is also configured to handle traffic distribution among the VPs 122 in the aggregation.

A slave VPA 114 is an aggregation (e.g., represented by software) of multiple VPs 122 that inherits status and policy from the corresponding master VPA 112. The slave VP 114 is configured to determine its own aggregation and traffic distribution among the corresponding VPs 122. The master VPA 112 and the slave VPAs 114 are each associated with a different set of VPs 122 and may have different aggregation and traffic distribution arrangements. The different sets of VPs 122 determine the functions and shared/aggregated resources of the corresponding master VPA 112 and salve VPAs 114.

The resource management layer 120 includes one or more logical or virtual NICs 121 that each comprises one or more corresponding VPs 122. Each virtual NIC 121 represents a software component (e.g., at an OS layer) that corresponds to one of the physical NICs 130 at the hardware level. Each virtual NIC 121 is configured to manage and operate one or more functions of the corresponding physical NIC 130. Specifically, a virtual NIC 121 maintains one or more corresponding VPs 122 that are each fully functional, i.e., each VP 122 implements a separate function independent form the other VPs 122. The VPs 122 are configured (via software) to handle corresponding traffic (e.g., bi-directional traffic). As such, each VP 122 is assigned a corresponding address for directing corresponding traffic to/from the VP 122, transmitting and/or receiving traffic, and optionally other capability, such as bandwidth control or stateless offloading.

Each virtual NIC 121 in the resource management layer 120 is also coupled to a corresponding driver 124 via a flow classifier 123. The flow classifier 123 is configured (via software, hardware, or both) to steer or direct traffic (in either or both directions) between the VPs 122 and the physical NICs 130. The flow classifier 123 distributes network traffic (e.g., incoming and/or outgoing traffic) among the different VPs 122 using predetermined flows. For instance, the flows can be implemented as Media Access Control (MAC) addresses, or virtual network identifiers (IDs) and MAC addresses.

The driver 124 is implemented by software and allows the virtual NIC 121 to interact with the corresponding physical NIC 132 at the hardware level. For example, a SR-IOV NIC driver 124 is used to enable a virtual NIC 121 to interact, manage, and operate the SR-IOV NIC 132. Other suitable drivers 124 can also be used to allow other virtual NICs 121 to interact with other physical NICs 120, e.g., the multi-function NIC 134 and the multi-queue NIC 136. The components above of the resource management layer 120 (at the OS or software layer) interact with the physical NICs at the hardware level via a device organizer 125, which may be implemented using software, hardware, or both.

A VP 122 of the virtual NIC 121 is mapped (via the driver 124) to a function in the corresponding physical NIC 130. The virtual NIC 121 operates the function in the physical NIC 130 by operating the corresponding VP 122. For example, a first VP 122 in a first virtual NIC 121 is mapped to a virtual function (VF) in the SR-IOV NIC 132, and as second VP 122 in a second virtual NIC 121 is mapped to a queue function (Q) in the multi-Queue NIC 136. As such, the different functions at the different physical NICs 130 are partitioned into different VPs 122 at different virtual NICs 121. Additionally, the mapping between the VPs 122 and the functions in the physical NICs 130 may be changed to reallocate resources (e.g., bandwidth) among the VPs, for instance to adapt to hardware changes or changes in network conditions (bandwidth or traffic redistribution, link fault recovery, etc.). This reallocation of resources may be implemented dynamically during operation time as needed.

As described above, the functions supported by the physical NICs 130 are partitioned into separate VPs 122 at the virtual NICs 121. Further different groups of VPs 122, which may belong to different virtual NICs 121 and corresponding physical NICs 130, are aggregated into different VPAs, including the master VPA 112 and one or more slave VPAs 114. This allows the aggregation of different links (at the different physical NICs 130) into the same VPA and the sharing of bandwidth (associated with one physical NIC 130) among different VPAs. Each VPA can be used, e.g., independently as VNI provider instances, to manage and operate selected groups of VPs 122 and hence selected functionality and links of different hardware (i.e., the different physical NICs 130). A VPA at the VNI provider 111 can be used by one or more clients, e.g., virtual NICs 121 or other hosts, to provide associated services and functions as determined by the corresponding VPs 122 that map physical functions and links of underlying devices (the physical NIC 130).

The VPAs allow the virtualization of network resource (e.g., bandwidth) independent of hardware type (e.g., for different types of physical NICs 130). The master VPA 112 and the slave VPAs 114 may be reconfigured with different selections or groupings of VPs 122 when needed or desired, such as in the case of hardware change (e.g., addition, removal, or swapping of physical NICs 130) or to adapt to network conditions or requirements (e.g., change in bandwidth or link utilization/distribution).

The VNI provider 111 has relatively high performance, where each of the master VPA 112 and slave VPAs 114 can serve as a VNI provider instance that serves one or more clients and has aggregated link bandwidth of underlying devices (the physical NICs 130). The VNI provider 111 has sufficient or high availability, where the virtualization includes both sharing and aggregation of network resources (e.g., bandwidth) at the same time. This enables switching between relatively low bandwidth VNI and high bandwidth VNI, e.g., to serve different clients, while sharing the same underlying physical resource. The implementation is hardware independent, where the VPs 122 map the abilities of underlying physical hardware and provide generic network ability, e.g., using defined server-consumer models of VPs and VPAs. Aggregating the VPs 122 into VPAs hides hardware specific implementation and allows using installed drivers in existing network components. This aggregation also allows smooth migration among different types of physical hardware without compromising performance.

The master-slave model for aggregation can utilize existing standards, such as LACP for link aggregation, to aggregate multiple VPs from different services/devices, where more than one aggregation instance can be created on a physical device. With the features and benefits above, the apparatus 100 provides better sharing with lower cost, where relatively high bandwidth devices (e.g., with 10 GB/40 Gb Ethernet) can be shared among different kinds of clients (e.g., virtual NIC 121). Fine traffic control can also be achieved on VPA/VP basis for a converged network that incorporates multiple communications services, e.g., telephony and data communications.

Figure 2:
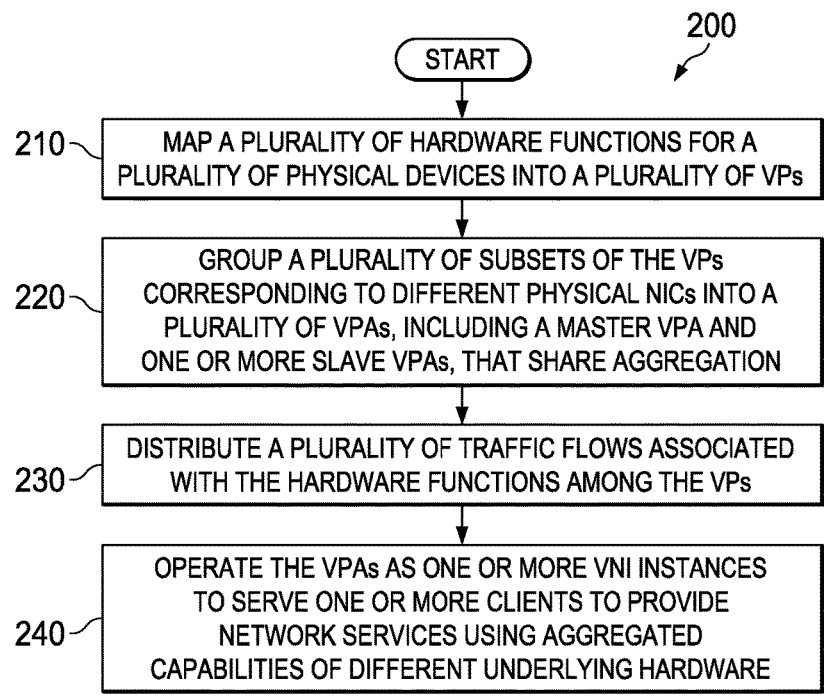
FIG. 2 illustrates en embodiment method for network resource virtual partitioning.

FIG. 2 illustrates en embodiment method 200 for network resource virtual partitioning. The method 200 may be implemented at the apparatus 100 or any other suitable network component for forwarding traffic and managing resource allocation. The method 900 allows hardware-independent virtualization using both SR-IOV devices for resource sharing and interface-level LACP-based link aggregation. At block or step 210, a plurality of hardware functions for a plurality of physical devices are mapped into a plurality of VPs, which may be configured at software level. For example, each physical device, such as a NIC, coupled to the network component (e.g., a router or bridge) may a have a plurality of physical functions that are mapped via a suitable driver into a plurality of corresponding VPs in a corresponding virtual NIC at an OS layer.

At step 220, a plurality of subsets of the VPs corresponding to different physical NICs are grouped into a plurality of VPAs, including a master VPA and one or more slave VPAs, that share aggregation status and policy. The aggregation status and policy are maintained at the master VPA and inherited to the slave VPAs. For example, at least two VPs corresponding to two different physical devices may be grouped into a VPA. The VPA is used as a virtual entity configured with different functions and capabilities independent of a specific hardware. The VPA can aggregate links from different hardware devices and share bandwidth with other VPAs.

At step 230, a plurality of traffic flows associated with the hardware functions are distributed among the VPs. For example, a flow classifier may be used for each corresponding physical device and virtual NIC to steer multiple traffic flows to and from the VPs, for example, using MAC addresses assigned to the flows. Each traffic flow may be associated with a VP address. At step 240, the VPAs are operated as VNI instances to serve one or more clients (e.g., virtual NICs or hosts/servers) to provide network services using aggregated capabilities of different underlying hardware.

Figure 3:
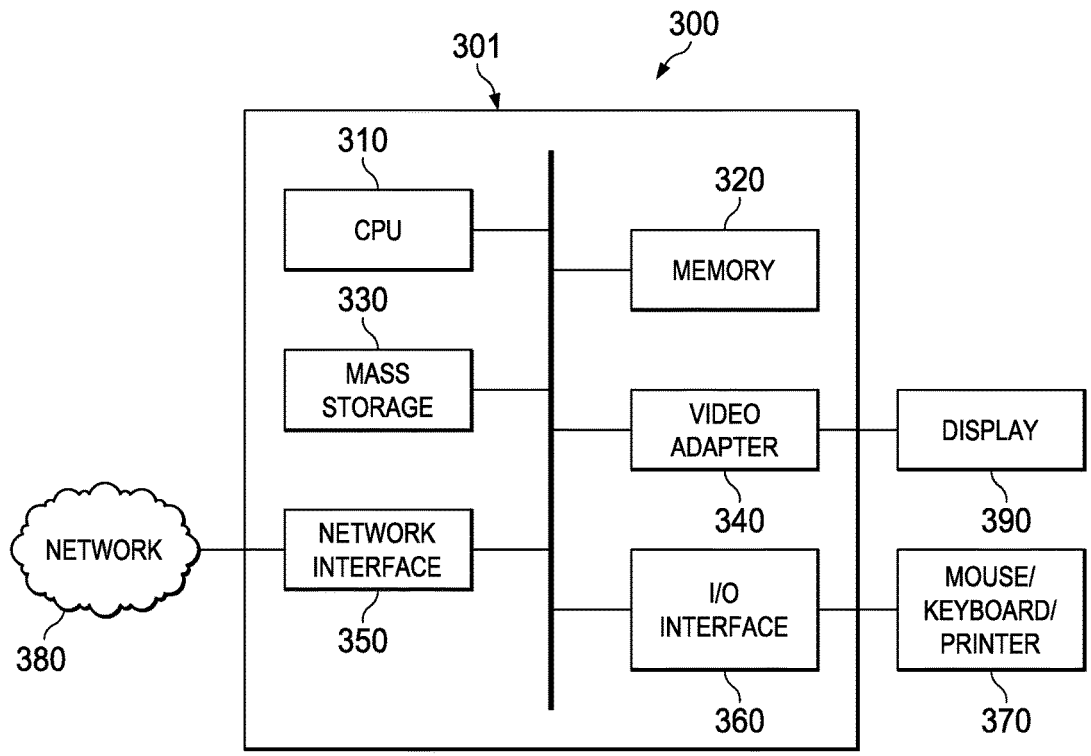
FIG. 3 is a block diagram of a processing system that can be used to implement various embodiments.

FIG. 3 is a block diagram of a processing system 300 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 300 may comprise a processing unit 301 equipped with one or more input/output devices, such as a speaker, microphone, mouse, touchscreen, keypad, keyboard, printer, display, and the like. The processing unit 301 may include a central processing unit (CPU) 310, a memory 320, a mass storage device 330, a video adapter 340, and an I/O interface 350 connected to a bus. The bus may be one or more of any type of several bus architectures including a memory bus or memory controller, a peripheral bus, a video bus, or the like.

The CPU 310 may comprise any type of electronic data processor. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs. The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The video adapter 340 and the I/O interface 360 provide interfaces to couple external input and output devices to the processing unit. As illustrated, examples of input and output devices include a display 390 coupled to the video adapter 340 and any combination of mouse/keyboard/printer 370 coupled to the I/O interface 360. Other devices may be coupled to the processing unit 301, and additional or fewer interface cards may be utilized. For example, a serial interface card (not shown) may be used to provide a serial interface for a printer.

The processing unit 301 also includes one or more network interfaces 350, which may comprise wired links, such as an Ethernet cable or the like, and/or wireless links to access nodes or one or more networks 380. The network interface 350 allows the processing unit 301 to communicate with remote units via the networks 380. For example, the network interface 350 may provide wireless communication via one or more transmitters/transmit antennas and one or more receivers/receive antennas. In an embodiment, the processing unit 301 is coupled to a local-area network or a wide-area network for data processing and communications with remote devices, such as other processing units, the Internet, remote storage facilities, or the like.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for network resource virtual partitioning, the method comprising:

mapping a plurality of hardware function types at each of a plurality of physical network interface devices into a set of virtual partitions (VPs) implemented using software at an operating system (OS) layer of a host network component coupled to the physical network interface devices, wherein the set of VPs corresponding to a plurality of hardware function types at each of the plurality of physical network interface devices provides virtualization of the corresponding plurality of hardware function types, wherein the plurality of physical network interface devices correspond to different sets of VPs, and wherein each VP at the OS layer of the host network component is associated with a corresponding media access control (MAC) address assigned to a corresponding traffic flow from and to the VP;

aggregating a plurality of different subsets of VPs corresponding to the plurality of physical network interface devices into a plurality of corresponding VP aggregations (VPAs), wherein the VPAs serve as virtual network interface (VNI) provider instances in servicing a plurality of clients; and managing and operating, at the OS layer, the hardware function types at each of the physical network interface devices using the corresponding set of VPs; and wherein the set of VPs corresponding to each of the physical network interface devices are configured to independently manage and operate the hardware function types at the corresponding physical network interface device.

2. The method of claim 1, wherein the VPAs are implemented using software and include a master VPA and one or more slave VPAs, and the method further comprising:

setting up and maintaining aggregation status and policy at the master VPA; and inheriting the aggregation status and policy to the slave VPAs.

3. The method of claim 2, wherein the master VPA comprises a first subset of VPs corresponding to the plurality of physical network interface devices and the one or more slave VPAs comprise a second subset of VPs corresponding to the plurality of physical network interface devices, the second subset of VPs being different than the first subset of VPs.

4. The method of claim 2, wherein the VPAs are maintained at a virtual network interface (VNI) provider, and wherein the VNI provider is operated in a dual-mode switchable between a standard VNI provider for a single network interface device and a sharable VNI provider that provides the VPAs for multiple network interface device devices.

5. The method of claim 1 further comprising remapping at least some of the hardware function types at one of the physical network interface devices to different VPs to adjust network resource allocation.

6. The method of claim 1 further comprising directing, to and from VPs corresponding to the physical network interface devices, a plurality of traffic flows forwarded by the hardware function types at the physical network interface devices, wherein the traffic flows are directed to the VPs using a plurality of Media access control (MAC) addresses, a plurality of virtual network identifiers (IDs), or both.

7. The method of claim 6, wherein the traffic flows are distributed among the VPs corresponding to the physical network interface devices using a flow classifier that is implemented using software.

8. An apparatus for network resource virtual partitioning, the apparatus comprising:

one or more physical network interface devices configured to communicate network traffic;

a processor; and a computer readable storage medium coupled to the processor and storing programming for execution by the processor, the programming including instructions to:

map a plurality of hardware function types at each of the one or more physical network interface devices into a set of virtual partitions (VPs) implemented using software at an operating system (OS) layer of the apparatus, wherein the set of VPs corresponding to the plurality of hardware function types at each of the one or more physical network interface devices provides virtualization of the corresponding plurality of hardware function types, wherein one or more physical network interface devices correspond to different sets of VPs, wherein the apparatus is coupled to the physical network interface devices, and wherein each VP at the OS layer of the apparatus is associated with a corresponding media access control (MAC) address assigned to a corresponding traffic flow from and to the VP;

aggregate a plurality of different subsets of VPs corresponding to the physical network interface devices into a plurality of corresponding VP aggregations (VPAs), wherein the VPAs are implemented using software and include a master VPA and one or more slave VPAs, and wherein the VPAs are operated to provide virtual network interface (VNI) provider instances to one or more clients;

set up and maintain aggregation status and policy at the master VPA; and manage and operate, at the OS layer, the hardware function types at each of the physical network interface devices using the corresponding set of VPs; and wherein the set of VPs corresponding to each of the physical network interface devices are configured to independently manage and operate the hardware function types at the corresponding physical network interface device.

9. The apparatus of claim 8, wherein each of the one or more physical network interface devices is mapped to a virtual network interface that comprises the set of VPs of the corresponding physical network interface device.

10. The apparatus of claim 9, wherein the one or more physical network interface devices comprise a Single Root Input/Output Virtualization (SR-IOV) network interface card (NIC), and wherein the hardware function types of the SR-IOV NIC are mapped to the corresponding set of VPs via a SR-IOV NIC driver.

11. The apparatus of claim 9, wherein the programming includes further instructions to implement a flow classifier that properly directs network traffic between the hardware function types of each of the one or more physical network interface devices and the corresponding set of VPs.

12. The apparatus of claim 11, wherein the network traffic comprises a plurality of flows that forwarded by the hardware function types, and wherein the flows are directed between the hardware function types and a plurality of individual VPs using a plurality of network addresses or identifiers (IDs) that associate the flows with the individual VPs.

13. The apparatus of claim 8, wherein the programming includes further instructions to:

inherit the aggregation status and policy to the slave VPAs.

14. The apparatus of claim 13, wherein the master VPA comprises a first subset of VPs corresponding to the one or more physical network interface devices and the one or more slave VPAs comprise a second subset of VPs corresponding to the one or more physical network interface devices, the second subset of VPs being different than the first subset of VPs.

15. The apparatus of claim 13, wherein the programming includes further instructions to: remap at least some of the hardware function types at one of the physical network interface devices to different VPs to adjust network resource allocation.

16. A network component supporting for network resource virtual partitioning, the network component comprising:

a processor; and a non-transitory computer readable storage medium coupled to the processor and storing programming for execution by the processor, the programming including instructions to:

map a plurality of hardware function types at each of a plurality of physical network interface devices into a set of virtual partitions (VPs) implemented using software at an operating system (OS) layer of the network component, wherein the set of VPs corresponding to the plurality of hardware function types at each of the plurality of physical network interface devices provides virtual functions of the corresponding plurality of hardware function types, wherein the plurality of physical network interface devices correspond to different sets of VPs, wherein the network component is coupled to the physical network interface devices, and wherein each VP at the OS layer of the network component is associated with a corresponding media access control (MAC) address assigned to a corresponding traffic flow from and to the VP;

aggregate the hardware function types at the plurality of physical network interface devices into a plurality of virtual partition aggregations (VPAs) at the OS layer, each VPA comprising a subset of VPs corresponding to the plurality of physical network interface devices, wherein the VPAs are implemented using software, and wherein the VPAs provide one or more network services via virtual network interface (VNI) provider instances that serve one or more clients; and manage and operate, at the OS layer, a plurality of subsets of the hardware function types at the physical network interface devices using corresponding VPAs; and wherein the VPAs are configured to independently manage and operate the plurality of corresponding subsets of the hardware function types to serve one or more clients.

17. The network component of claim 16, wherein the VPAs include a master VPA and one or more slave VPAs that share similar aggregation status and policy with the master VPA.

18. The network component of claim 16, wherein the VPAs share among each other bandwidth allocated for the plurality of physical network interface devices, and wherein each of the VPAs aggregates a plurality of links that correspond to multiple physical network interface devices.

19. The network component of claim 16, wherein the VPAs comprises a plurality of virtual partitions (VPs) that map the hardware function types at one of the plurality of physical network interface devices.

20. The network component of claim 19, wherein the VPs and the VPAs are configured to support both Single Root Input/Output Virtualization (SR-IOV) based devices for resource sharing and interface-level Link Aggregation Control Protocol (LACP) based link aggregation.

21. The network component of claim 19, wherein the VPs and the VPAs are configured to manage and operate the corresponding subsets of the hardware function types independent of a hardware type of the physical network interface devices.

* * * * *